United States Patent
Adams (10) Patent No.: US 9,638,092 B2
(45) Date of Patent: May 2, 2017

(54) COMBUSTION-POWERED TOOL WITH FLEXIBLE SILICONE CONTROL CHECK VALVE OPERABLE BETWEEN A PRIMARY COMBUSTION CHAMBER AND A SECONDARY COMBUSTION CHAMBER

(71) Applicant: Joseph S. Adams, Armstrong (CA)

(72) Inventor: Joseph S. Adams, Armstrong (CA)

(*) Notice: Subject to any disclaimer, the term of this patent is extended or adjusted under 35 U.S.C. 154(b) by 371 days.

(21) Appl. No.: 14/311,227

(22) Filed: Jun. 20, 2014

(65) Prior Publication Data
US 2015/0369118 A1  Dec. 24, 2015

(51) Int. Cl.
*F02B 19/02* (2006.01)
*F02B 63/02* (2006.01)
*F01B 11/04* (2006.01)

(52) U.S. Cl.
CPC ............ *F02B 19/02* (2013.01); *F01B 11/04* (2013.01); *F02B 63/02* (2013.01); *Y02T 10/125* (2013.01)

(58) Field of Classification Search
CPC .......... F02B 19/02; F02B 63/02; F01B 11/04; B25C 1/18; B25C 1/105; B25C 1/08; B25C 1/14; B25C 1/188; B25C 1/123
See application file for complete search history.

(56) References Cited

U.S. PATENT DOCUMENTS

| | | | | |
|---|---|---|---|---|
| 4,053,136 A | * | 10/1977 | Perl | F23N 5/047 236/101 E |
| 4,365,471 A | * | 12/1982 | Adams | F02K 7/02 102/305 |
| 4,647,013 A | * | 3/1987 | Giachino | B41J 2/17596 239/102.2 |
| 4,721,240 A | * | 1/1988 | Cotta | B25C 1/08 123/46 SC |
| 5,046,281 A | * | 9/1991 | Murphy | A01G 7/06 47/57.5 |
| 5,213,247 A | * | 5/1993 | Gschwend | B25C 1/08 227/10 |

(Continued)

*Primary Examiner* — Hung Q Nguyen
*Assistant Examiner* — Brian P Monahon
(74) *Attorney, Agent, or Firm* — Law Offices of Steven W. Weinrieb (57) ABSTRACT

A combustion-powered tool comprises a primary combustion chamber, a secondary combustion chamber, and a working piston that is in fluidic connection with the secondary combustion chamber so as to be exposed to the pressures developed within the secondary combustion chamber, when combustion takes place within the secondary combustion chamber, such that the working piston can be driven through its working or power stroke. A flexible silicone rubber plate-type control check valve is interposed between the primary combustion chamber and the secondary combustion chamber so as to control the flow of combustion products from the primary combustion chamber into the secondary combustion chamber and yet prevent the flow of combustion products from the secondary combustion chamber back into the primary combustion chamber, when combustion occurs within the secondary combustion chamber, such that the pressures developed within the secondary combustion chamber, as a result of the combustion of the air/fuel mixture within the secondary combustion chamber, can in fact act upon the working piston so as to drive the same through its working or power stroke.

11 Claims, 5 Drawing Sheets

(56) References Cited

U.S. PATENT DOCUMENTS

| | | | |
|---|---|---|---|
| 6,260,519 B1 * | 7/2001 | Phillips | B25C 1/08 123/46 R |
| 6,863,045 B2 * | 3/2005 | Ricordi | B25C 1/08 123/262 |
| 7,128,030 B2 * | 10/2006 | Gschwend | B25C 1/08 123/46 H |
| 7,322,501 B2 * | 1/2008 | Ishizawa | B25C 1/042 227/10 |
| 8,347,832 B2 | 1/2013 | Adams | |
| 8,511,264 B2 | 8/2013 | Adams | |
| 2002/0144498 A1 * | 10/2002 | Adams | B25C 1/08 60/39.6 |
| 2005/0092807 A1 * | 5/2005 | Adams | B25C 1/08 227/10 |
| 2008/0169326 A1 * | 7/2008 | Moeller | B25C 1/08 227/10 |
| 2011/0073631 A1 * | 3/2011 | Tippmann, Sr. | F01B 11/008 227/10 |
| 2012/0000961 A1 * | 1/2012 | Zhu | B25C 1/08 227/10 |
| 2012/0210974 A1 * | 8/2012 | Adams | B23Q 5/033 123/253 |

* cited by examiner

COMBUSTION-POWERED TOOL WITH FLEXIBLE SILICONE CONTROL CHECK VALVE OPERABLE BETWEEN A PRIMARY COMBUSTION CHAMBER AND A SECONDARY COMBUSTION CHAMBER

STATEMENT REGARDING FEDERALLY SPONSORED RESEARCH OR DEVELOPMENT

Not Applicable

NAMES OF PARTIES TO JOINT RESEARCH AGREEMENT

Not Applicable

INCORPORATION BY REFERENCE OF MATERIAL SUBMITTED ON A COMPACT DISC

Not Applicable

FIELD OF THE INVENTION

The present invention relates generally to combustion-powered tools, and more particularly to a new and improved combustion-powered tool comprising a primary combustion chamber, a secondary combustion chamber, and a working piston that is in fluidic connection with the secondary combustion chamber so as to be exposed to the pressures developed within the secondary combustion chamber, when combustion takes place within the secondary combustion chamber, such that the working piston can be driven through its working or power stroke. A flexible silicone rubber plate-type control check valve is interposed between the primary combustion chamber and the secondary combustion chamber so as to control the flow of unburned fuel from the primary combustion chamber into the secondary combustion chamber and yet prevent the flow of combustion products from the secondary combustion chamber back into the primary combustion chamber, when combustion occurs within the secondary combustion chamber, such that the pressures developed within the secondary combustion chamber, as a result of the combustion of the air/fuel mixture within the secondary combustion chamber, can in fact act upon the working piston so as to drive the same through its working or power stroke.

BACKGROUND OF THE INVENTION

Combustion-powered tools are of course well-known. A preferred system for combustion-powered tools comprises the use of a first or primary combustion chamber, and a second or secondary combustion chamber, wherein the first and second combustion chambers are separated from each other by means of a wall, however, they are also fluidically connected to each other by means of a control check valve. In this manner, the control check valve effectively permits unburned fuel and the flame front, generated within the first or primary combustion chamber as a result of the ignition of the air/fuel mixture disposed within the first or primary combustion chamber, to travel across the control check valve, enter the second or secondary combustion chamber, ignite the air/fuel mixture disposed within the second or secondary combustion chamber, and yet effectively prevent the combustion products generated within the second or secondary combustion chamber from flowing back into the first or primary combustion chamber as a result of the closure of the control check valve back to its original closed and seated position prior to the ignition of the air/fuel mixture within the first or primary combustion chamber. The combustion of the air/fuel mixture within the second or secondary combustion chamber is therefore effectively wholly contained within or confined to the second or secondary combustion chamber whereby the pressures developed within the second or secondary combustion chamber, as a result of the ignition of the air/fuel mixture within the second or secondary combustion chamber, can act upon the working piston so as to drive the same through its working or power stroke.

It is also noted that the use of two, serially connected combustion chambers, that is, a first or primary combustion chamber and a second or secondary combustion chamber, as has been briefly described hereinbefore, results in the development of pressure levels to power or drive the working piston which are greater and more efficient than those that would normally be capable of being achieved by means of a single combustion chamber. It is necessary, however, that, in order to achieve these greater pressure and efficiency levels, the control check valve must be capable of meeting several operational parameters. For example, the control check valve must be capable of withstanding high mechanical shocks, such as, for example, when the rapid explosive combustion takes place within the second or secondary combustion chamber. The control check valve must likewise be capable of operating under minimal pressures being exerted upon the side of the control check valve that is exposed to the first or primary combustion chamber, as a result of the combustion of the air/fuel mixture within the first or primary combustion chamber, so as to be quickly unseated from its valve seat and thereby permit a relatively high flow rate of unburned fuel and resulting flame fronts to pass by the control check valve from the first or primary combustion chamber and into the second or secondary combustion chamber in order to initiate combustion of the air/fuel mixture disposed within the second or secondary combustion chamber, and it must be capable of doing this without causing any quenching of the flame fronts. Still further, the control check must be capable of quickly returning to its original closed and seated position so as to contain or confine the air/fuel mixture within the second or secondary combustion chamber, and to effectively and repeatedly provide a perfect seal with its valve seat. Lastly, the mounting of the control check valve upon its valve seat and within the system must be considered so as to in fact permit the aforenoted operational parameters to be achieved.

Different types of valves have been previously attempted to be used within such combustion-powered tools, however, they all resulted in failure for one reason or another. For example, metallic reed valves were tried, however, they were difficult to mount at their operational positions, and they were prone to structural failure due to their incapability of withstanding the shock loading characteristic of the rapid explosive combustion taking place within the second or secondary combustion chamber. Accordingly, the valves were effectively deformed so as not to be capable of returning to their original positions and resuming their sealing functions. They were also unable to quickly react to the initial pressures developed within the first or primary combustion chamber such that the desired flow rates of the combustion products and the propagation of the flame fronts from the first or primary combustion chamber, into the second or secondary combustion chamber, could be achieved. Additional reed valve designs comprised the use of smaller multiple ports in lieu of a relatively large single port, however, this also resulted in operational failure due to the fact that the flame front was extinguished or quenched as the flame front passed through the multiple ports.

Poppet valves have also been experimented with, however, in view of the fact that the control check valve needs to act extremely quickly, that is, the control check valve needs to return to its original closed or seated position within a time frame of between 1-2 milliseconds, the poppet valve needed to be provided with a biasing spring which would exhibit substantial tension. Unfortunately, in view of this, the poppet-type control check valve exhibited low fluid flow rates, flame quenching, and other operational problems which rendered the same unusable for use in such combustion-powered tool systems.

A need therefore exists for a new and improved combustion-powered tool, comprising a first or primary combustion chamber and a second or secondary combustion chamber, wherein a control check valve can be operatively interposed between the first or primary combustion chamber and the second or secondary combustion chamber, and wherein the control check valve can in fact withstand the high mechanical shock pressures and forces attendant explosive combustion conditions present within the second or secondary combustion chamber, the control check valve can withstand the high temperature levels present within the combustion chambers, the control check valve will not suffer a breakdown in its structural integrity so as not to, in turn, become deformed whereby the control check valve would no longer be capable of achieving its sealing functions, and the surfaces of the control check valve will also be characterized by excellent wear characteristics as well as low temperature absorption properties so as to eliminate quenching.

SUMMARY OF THE INVENTION

The foregoing and other objectives are achieved in accordance with the teachings and principles of the present invention through the provision of a new and improved combustion-powered tool comprising a primary combustion chamber, a secondary combustion chamber, and a working piston that is in fluidic connection with the secondary combustion chamber so as to be exposed to the pressures developed within the secondary combustion chamber, when combustion takes place within the secondary combustion chamber, such that the working piston can be driven through its working or power stroke. A flexible silicone rubber plate-type control check valve is interposed between the primary combustion chamber and the secondary combustion chamber so as to control the flow of unburned fuel from the primary combustion chamber into the secondary combustion chamber and yet prevent the flow of combustion products from the secondary combustion chamber back into the primary combustion chamber, when combustion occurs within the secondary combustion chamber, such that the pressures developed within the secondary combustion chamber, as a result of the combustion of the air/fuel mixture within the secondary combustion chamber, can in fact act upon the working piston so as to drive the same through its working or power stroke.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 5 is a schematic cross-sectional view, similar to that of FIG. 4, of the new and improved combustion-powered tool, wherein combustion has been initiated within the second or secondary combustion chamber as a result of which the flexible silicone rubber plate-type control check valve has been returned to its normal seated and sealed position with respect to its valve seat, all flow from the second or secondary combustion chamber back to the first or primary combustion chamber has been blocked by means of the seated flexible silicone rubber plate-type control check valve, and the pressures developed within the second or secondary combustion chamber, as a result of the combustion of the air/fuel mixture within the second or secondary combustion chamber, act upon the working piston so as to move the working piston downwardly within its working cylinder and through its working or power stroke.

DETAILED DESCRIPTION OF THE PREFERRED EMBODIMENT

Figure 2:
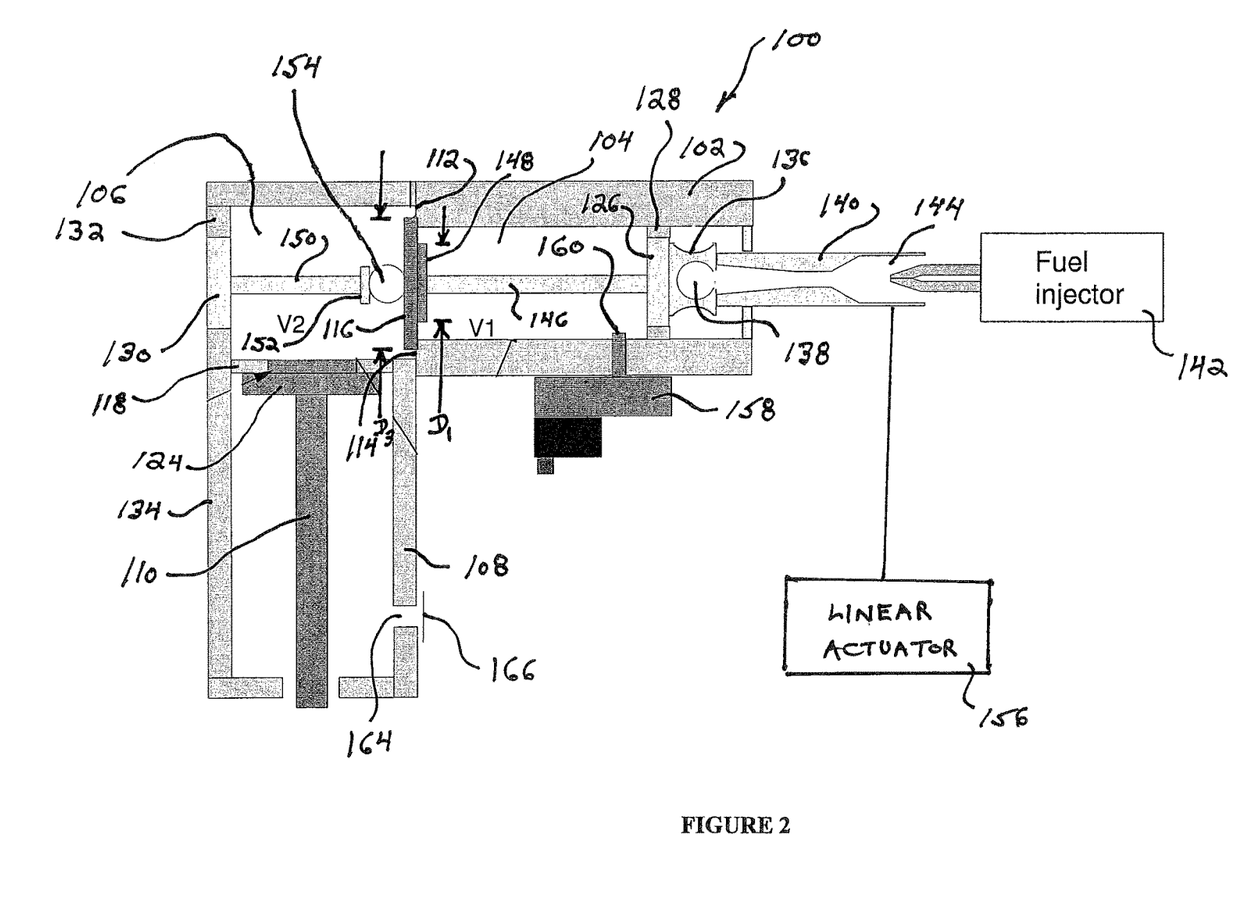
FIG. 2 is a schematic cross-sectional view, similar to that of FIG. 1, of the new and improved combustion-powered tool, wherein the upper valve assembly has been moved rightwardly toward its normally closed position in preparation for the commencement of a combustion and power operation cycle within the combustion-powered tool.

Referring now to the drawings, and more particularly to FIG. 2 thereof, a new and improved combustion-powered tool, constructed in accordance with the teachings and principles of the present invention, is disclosed and is designated by the reference character 100. More particularly, it is seen that the new and improved combustion-powered tool 100 comprises a horizontally oriented elongated tube or cylinder 102 within which a first or primary combustion chamber 104, having a volume V1, is defined within an upstream or right end portion of the horizontally oriented elongated tube or cylinder 102, while a second or secondary combustion chamber 106, having a volume V2, is likewise defined within a downstream or left end portion of the tube or cylinder 102. In addition, it is seen that the combustion-powered tool 100 also comprises a vertically oriented elongated working or power cylinder 108 within which there is movably disposed a working or power piston 110. It is also seen that the working or power cylinder 108 is fixedly attached to a peripheral end wall portion 112 of the horizontally oriented elongated tube or cylinder 102 which defines the downstream or left end portion of first or primary combustion chamber 104, and that upper and lower end wall portions 112 of the horizontally oriented elongated tube or cylinder 102 define upper and lower valve seats 114 upon which upper and lower peripheral edge portions of a flexible silicone rubber plate-type control check valve 116 are adapted to be seated when the flexible silicone rubber plate-type control check valve 116 is disposed at its normally closed position. The upper end wall portion 118 of the working cylinder 108 defines a side wall portion of the second or secondary combustion chamber 106, and it is seen that the upper end wall portion 118 of the working cylinder 108 is effectively an annular wall member which has a central aperture 120 defined therein, as can best be seen in FIG. 5, for accommodating a first relatively small portion 122 of the piston head of the working piston 110 when the working piston 110 is disposed at its normal non-working position. It is further seen that a second relatively large annular portion 124 of the piston head engages an annular undersurface surface portion of the annular wall member 118 such that the engagement of the second relatively large portion 124 of the piston head with the undersurface portion of the annular wall member 118 defines the normal seated position of the working piston 110 when the working piston 110 is not undergoing movement throughout its power or return strokes.

Figure 1:
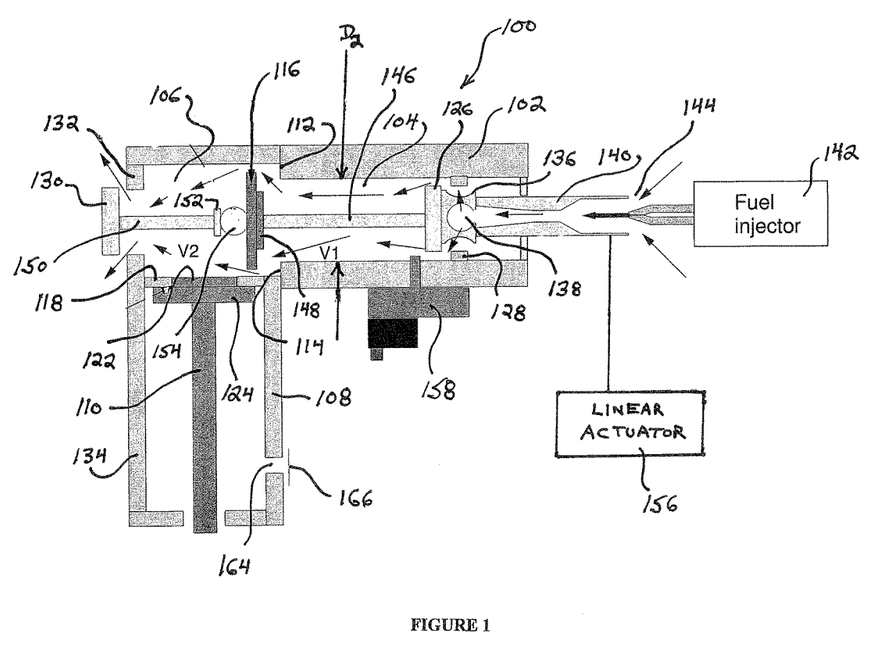
FIG. 1 is a schematic cross-sectional view of a new and improved combustion-powered tool, constructed in accordance with the teachings and principles of the present invention, wherein the upper valve assembly has been moved leftwardly from its normally closed position, after the working piston has returned to its normal non-working position, so as to permit a new air/fuel mixture to flow into the first or primary combustion chamber while combustion products are exhausted and/or scavenged out from the second or secondary combustion chamber.

With reference additionally being made to FIG. 1, it is seen that the combustion-powered tool 100 further comprises an axially movable intake valve 126 which is operatively associated with a peripheral intake valve seat 128 fixedly mounted upon an interior upstream end portion of the elongated tube or cylinder 102 defining the main or primary combustion chamber 104 such that the intake valve 126 can be seated upon, or unseated from, the intake valve seat 128 as illustrated within FIGS. 1-5. In a similar manner, it is also seen that an axially movable exhaust valve 130 is operatively associated with a peripheral exhaust valve seat 132 which is integrally defined as part of the left, vertically upstanding wall portion 134 of the working cylinder 108 which also, in effect, defines the left end wall of the second or secondary combustion chamber 106, such that the exhaust valve 130 can also be seated upon, or unseated from, the exhaust valve seat 132 as illustrated within FIGS. 1-5. In addition, in order to linearly move the intake and exhaust valves 126,130 between their seated or closed positions as illustrated within FIG. 2-5, and their open or unseated positions as illustrated within FIG. 1, the intake and exhaust valves 126,130 are fixedly mounted upon a linearly movable assembly. More particularly, it is seen that the intake valve 126 is fixedly mounted upon the head of an air/fuel mixture intake port assembly 136 within which there is defined an air/fuel mixture outlet port 138 for outputting an air/fuel mixture into the main or primary combustion chamber 104 when the intake valve 126 has been unseated from its valve seat 128. The air/fuel mixture intake port assembly 136 is fixedly mounted upon the downstream end of a venturi structure 140, and it is also seen that the air/fuel mixture outlet port 138 is adapted to be fluidically connected to the downstream end of the venturi structure 140. The upstream end of the venturi structure 140 is fluidically connected to a fuel injector 142, and the fuel injector 142 is operatively disposed upstream of the venturi structure 140 so as to effectively define with the venturi structure 140 a jet pump 144 by means of which ambient air, as schematically illustrated by means of the arrows, can be entrained into the stream of fuel, when fuel is injected into the upstream end of the venturi structure 140 from the fuel injector 142, so as to form a desirable air/fuel mixture. Jet pumps of this type are known as illustrated and disclosed within U.S. Pat. Nos. 8,511,264 and 8,347,832, both of which issued to Joseph S. Adams.

It is further noted that the intake valve 126, fixedly mounted upon the head of the air/fuel mixture intake port assembly 136, is fixedly connected to or mounted upon the upstream end of a first axially oriented rod 146, and that the downstream end of the first axially oriented rod 146 has a substantially rectangular mounting plate 148 fixed thereon. The mounting plate 148, in turn, serves as a mounting structure upon which the central portion of the flexible silicone rubber plate-type check valve 116 is fixedly secured, the check valve 116 likewise having a substan-tially rectangular configuration. As can best be seen from FIGS. 1 and 2, the mounting plate 148 has a predetermined vertical extent $D_1$ which is less than the internal diametrical extent $D_2$ of the main or primary combustion chamber 104, while the vertical extent $D_3$ of the flexible silicone rubber plate-type check valve 116 is seen to be substantially greater than the vertical extent $D_1$ of the mounting plate 148 such that the upper and lower edge portions of the flexible silicone rubber plate-type check valve 116, as viewed in the drawings, are adapted to engage and be seated upon the upper and lower peripheral edge portions of the valve seat 114 so as to fluidic-ally close off the second or secondary combustion chamber 106 from the main or primary combustion chamber 104 as can best be seen in FIGS. 2 and 5. Conversely, when the upper and lower edge portions of the flexible silicone rubber plate-type check valve 116 have been unseated from its valve seats 114, upper and lower fluid flow passages 149 are effectively defined between the upper and lower edge portions of the mounting plate 148, the upper and lower valve seats 114, and the upper and lower edge portions of the flexible silicone rubber plate-type check valve 116 as can best be seen, for example, within FIGS. 3 and 4. Continuing still further, it is seen that the exhaust valve 130 is fixedly mounted upon a downstream end portion of a second axially oriented rod 150, and that the upstream end of the second axially oriented rod 150 has a relatively small head 152 fixedly mounted thereon. Rod 150 can actually comprise a threaded rod and head 152 can actually comprise a nut member. The head or nut member 152 is adapted to engage a cylindrical roller 154, or alternatively, the rod 150 can extend into the roller 154, the important feature being the fact that the exhaust valve 130, the rod 150, the head or nut member 152, and the roller 154 are fixedly secured together so as to effectively de-fine a single movable unit. Still further, the second rod 150 and the first rod 146 can actually be a single rod upon which the flexible silicone rubber plate-type control check valve 116 and the mounting plate 148 are also fixedly secured. It is to be noted that the cylindrical roller 154 extends transversely across the entire width of the second or secondary combustion chamber 106, as may be envisioned as extending along an axis projecting into and out from the pages upon which the drawing figures are illustrated, so as to fixedly support the flexible silicone rubber plate-type check valve 116 across its entire width. In this manner, the only flexibly movable portions of the flexible silicon rubber plate-type check valve 116 will be those upper and lower peripheral edge portions which will be moved away from, and returned to, the upper and lower valve seats 114 at predetermined times during the combustion, working or power, and charging/scavenging cycles of the tool. It is lastly noted that a suitable linear actuator 156 is operatively connected to the venturi structure 140, and in this manner, the intake valve 126, the exhaust valve 130, and the flexible silicone rubber plate-type control check valve 116 can be moved leftwardly or rightwardly as necessary during the combustion, working or power, and charging/scavenging cycles of the tool.

Having described essentially all of the operative components of the new and improved combustion-powered tool of the present invention, a brief description of the operation of the tool will now be presented. More particularly, as can be seen in FIG. 1, the linear actuator 156 has been activated so as to, in turn, actuate and move the linearly movable assembly, comprising the exhaust valve 130, the flexible silicone rubber plate-type control check valve 116, and the intake valve 126, to the left, as viewed within FIG. 1, from their closed or seated positions to their open or unseated positions relative respectively to the exhaust valve seat 132, the upper and lower valve seats 114, and the intake valve seat 128. In this manner, the combustion-powered tool 100 is now disposed at an air/fuel mixture intake position at which an air/fuel mixture can be ingested into the first or primary combustion chamber 104 while combustion products are scavenged and exhausted out from the second or secondary combustion chamber 106. In particular, as a result of fuel injection from the fuel injector 142 into the venturi 140, ambient air 144 is entrained into the fuel flow so as to form an air/fuel mixture. The air/fuel mixture flows downstream through the venturi 140, into the air/fuel mixture intake port assembly 136, out through the air/fuel mixture outlet port 138, around the intake valve 126, and into the first or primary combustion chamber 104. The air/fuel mixture continues to flow downstream so as to exit the first or primary combustion chamber 104, around the flexible silicone rubber plate-type control check valve 116, into the second or secondary combustion chamber 106, and out from the second or secondary combustion chamber 106 past the exhaust valve 130. Accordingly, a new charge of the air/fuel mixture is ingested into the main or primary combustion chamber 104 while combustion products disposed within the second or secondary combustion chamber 106 are scavenged and exhausted outwardly therefrom by means of an additional fresh charge of an air/fuel mixture into the second or secondary combustion chamber 106.

After completion of the charging of the new air/fuel mixture into the first or primary combustion chamber 104 and the scavenging and exhaust of combustion products out from the second or secondary combustion chamber 106, the linear actuator 156 is again actuated so as to move the linearly movable assembly, comprising the exhaust valve 130, the flexible silicone rubber plate-type control check valve 116, and the intake valve 126, to the right, as now viewed within FIG. 2, from their open or unseated positions, as shown in FIG. 1, to their closed or seated positions, as shown in FIG. 2, relative respectively to the exhaust valve seat 132, the upper and lower valve seats 114, and the intake valve seat 128. In this manner, a fresh air/fuel mixture charge is effectively trapped within the first or primary combustion chamber 104, as well as within the second or secondary combustion chamber 106, and is ready for the initiation of combustion. In order to initi-ate combustion, the first or primary combustion chamber 104 is provided with a suitable ignition device 158 which includes, for example, a spark plug 160 which extends into the first or primary combustion chamber 104. Upon activation of the ignition device 158, including spark plug 160, combustion of the air/fuel mixture occurs within the first or primary combustion chamber 104, and accordingly, laminar flame fronts 162 are developed within the first or primary combustion chamber 104 and then propagate downstream toward the flexible silicone rubber plate-type con-trol check valve 116, as is illustrated within FIG. 3, whereby the pressures de-veloped by the flame fronts 162 within the first or primary combustion chamber 104 force the upper and lower edge portions of the flexible silicone rubber plate-type control check valve 116 to become unseated from their respective upper and lower valve seats 114.

It is important to note that the roller 154, utilized in conjunction with the flexible silicone rubber plate-type control check valve 116, is a cylindrical roller which extends transversely across the entire width of the second or secondary combustion chamber 106 as opposed to a spherically shaped roller, and that the cylindrical roller 154 engages the side surface of the flexible silicone rubber plate-type check valve 116 that is exposed to the second or secondary combustion chamber 106. The reason for this is that a spherically shaped roller would effectively define or develop a point-type contact region with respect to the flexible silicone rubber plate-type control check valve 116 as opposed to a linear type contact region. If a point-type contact region was effectively defined or developed between the spherically shaped roller and the flexible silicone rubber plate-type control check valve 116, then when the flexible silicone rubber plate-type control check valve 116 opened and became unseated with respect to or from its valve seats 114, an entire annular or conical portion of the flexible silicon rubber plate-type control check valve 116 would have to be accommodated and controlled as opposed to the simple, smoothly arcuate-shaped upper and lower peripheral edge portions of the flexible silicone rubber plate-type control check valve 116 as they effectively move about and around the cylindrical roller 154. Such an annularly or conically controlled check valve region is significantly more difficult to control in order to result in or achieve the desired flow of the flame fronts past and around the flexible silicone rubber plate-type control check valve 116, and still further, it would be significantly more difficult to uniformly return the opened and unseated annular portions of the flexible silicone rubber plate-type control check valve 116 back onto their valve seat portions 114 than to have the smoothly arcuate upper and lower peripheral edge portions of the illustrated flexible silicone rubber plate-type control check valve 116, as defined by means of the cylindrical roller 154, open and unseat with respect to their valve seat portions 114, and to return the upper and lower peripheral edge portions of the illustrated flexible silicone rubber plate-type control check valve 116 to their seated positions upon the valve seats 114.

Figure 3:
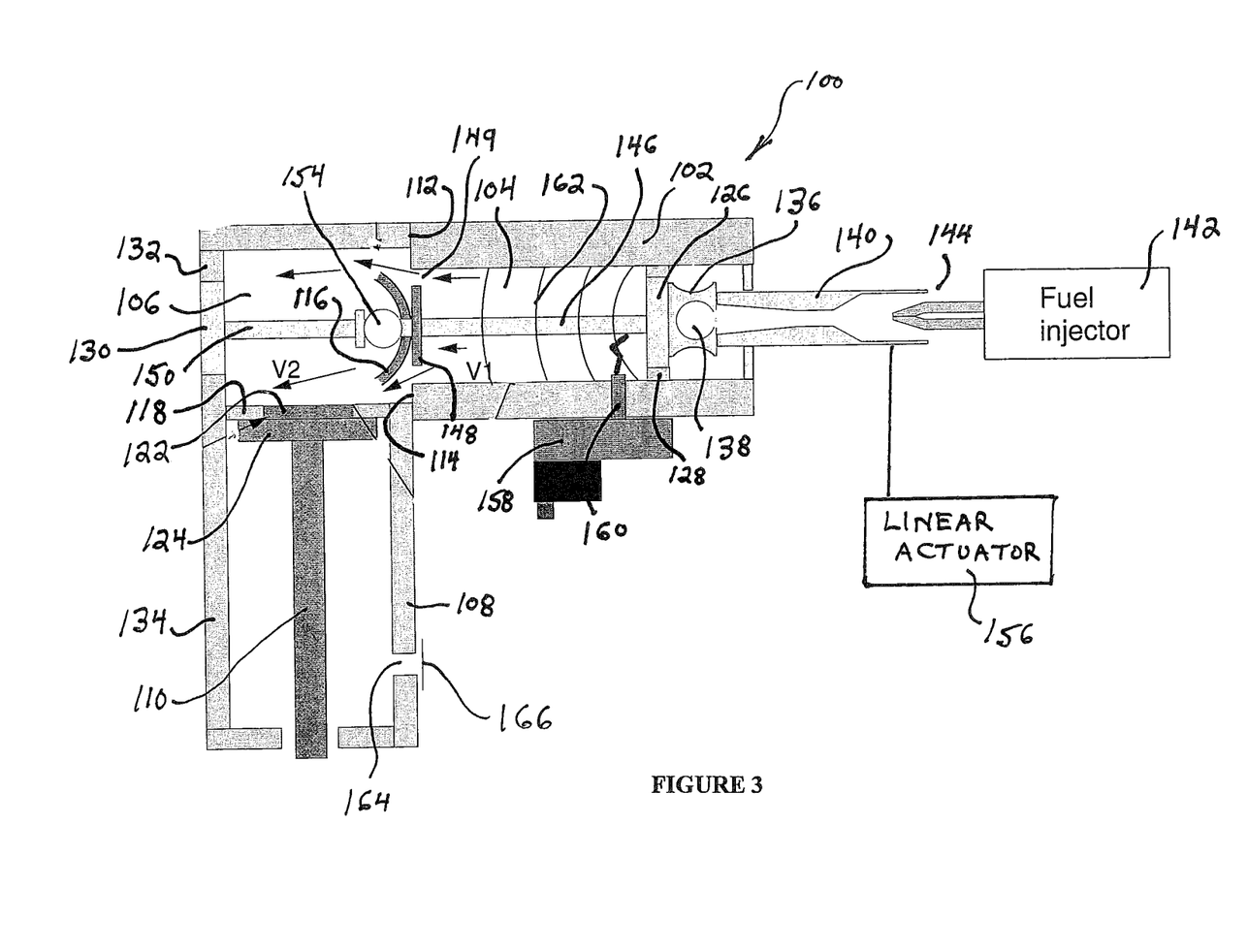
FIG. 3 is a schematic cross-sectional view, similar to that of FIGS. 1 and 2, of the new and improved combustion-powered tool, wherein ignition has been initiated within the first or primary combustion chamber as a result of which the advancing flame fronts has caused the flexible silicone rubber plate-type control check valve to be unseated from its valve seat so as to permit unburned fuel from the first or primary combustion chamber, as well as the first flame front, to pass by the flexible silicone rubber plate-type control check valve so as to, in turn, enter the second or secondary combustion chamber and initiate ignition of the air/fuel mixture disposed within the second or secondary combustion chamber.
Figure 4:
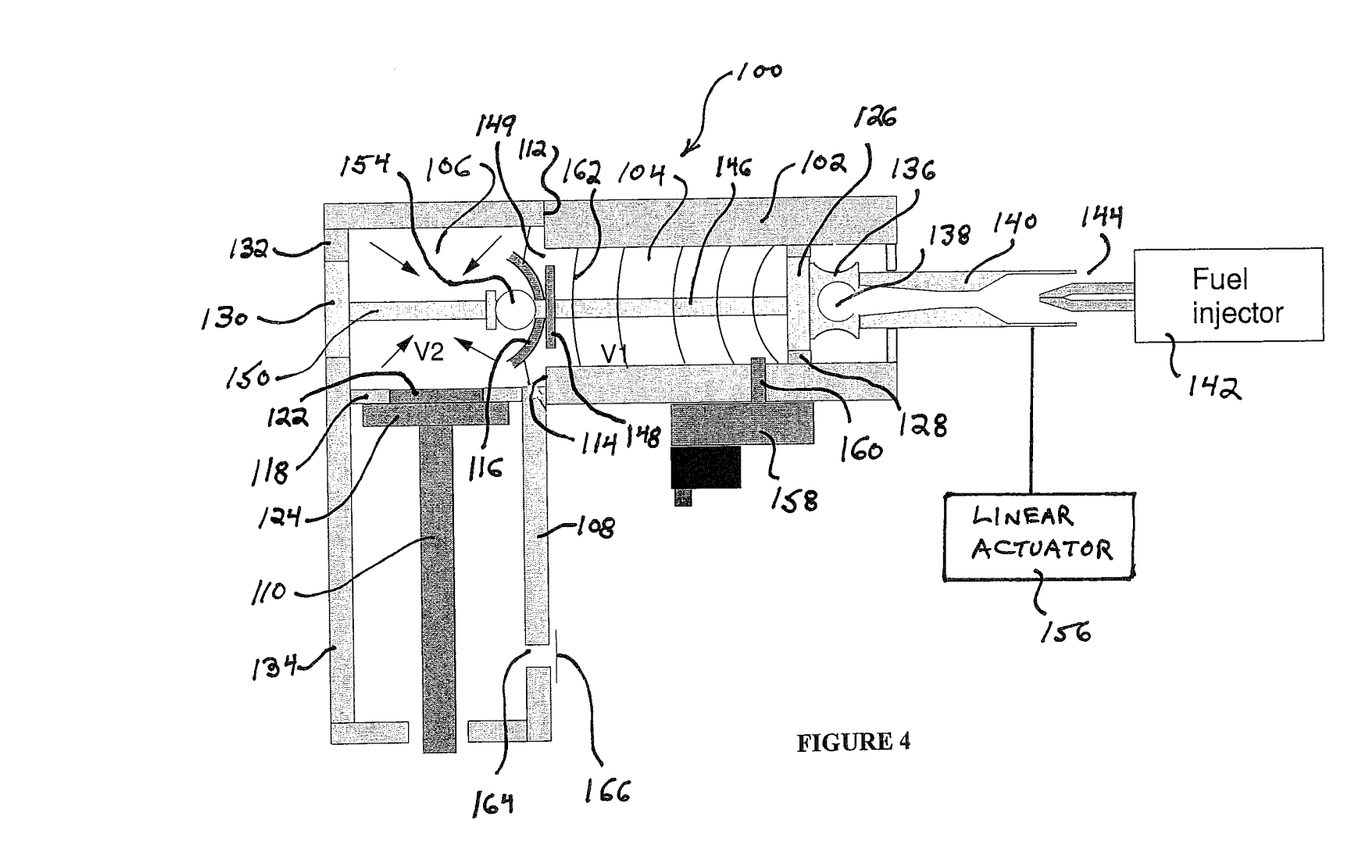
FIG. 4 is a schematic cross-sectional view, similar to that of FIG. 3, of the new and improved combustion-powered tool, wherein the first flame front has in fact bypassed the flexible silicone rubber plate-type control check valve and has entered the second or secondary combustion chamber whereby ignition has been initiated within the second or secondary combustion chamber.

Continuing further, and with reference still being made to FIG. 3, as the laminar flame fronts 162 propagate downstream through the first or primary combustion chamber 104, they push and compress the unburned air/fuel mixture, disposed within the first or primary combustion chamber 104, ahead of them, forcing the flexible silicone rubber plate-type control check valve 116 to become unseated from its valve seats 114. In addition, when the first flame front 162 passes into the second or secondary combustion chamber 106, as can best be seen in FIG. 4, the laminar flame front and pressure cause the unburned air/fuel mixture, disposed within the second or secondary combustion chamber 106, to become turbulent and also to be compressed. In addition, as the laminar flame front 162 passes by the flexible silicone rubber plate-type control check valve 116 and enters the second or secondary combustion chamber 106, the flame front 162 will ignite the air/fuel mixture disposed within the second or secondary combustion chamber 106. This is schematically illustrated by means of the converging arrows illustrated within FIG. 4. Another important feature of the present invention that is to be particularly noted is that the utilization of silicone rubber, or a similar material, for fabricating the flexible plate-type control check valve 116 is important because silicone rubber, or a similar material, is characterized by means of a low thermal absorption rate, as opposed to, for example, that of metal.

Accordingly, since little heat will be absorbed by the flexible silicone rubber plate-type control check valve 116, as the flame front passes or crosses the flexible silicone rubber plate-type control check valve 116, the flame front 162 will not run the risk of being extinguished or quenched. Therefore, the flame front 162 can in fact effectively survive the transmission or travel from the first or primary combustion chamber 104 into the second or secondary combustion chamber 106 so as to in fact ignite the air/fuel mixture disposed within the second or secondary combustion chamber 106. It is also to be noted that while prolonged exposure of the flexible silicone rubber plate-type control check valve 116 to flame fronts 162 would effectively destroy the flexible silicone rubber plate-type control check valve 116, the flexible silicone rubber plate-type control check valve 116 can in fact withstand exposure to the flame front 162 for a brief period of time, such as, for example, 2-3 milliseconds which is the time it takes for the flame front 162 to pass from the first or primary combustion chamber 104, into the second or secondary combustion chamber 106, and to ignite the air/fuel mixture disposed within the second or secondary combustion chamber 106. The air/fuel mixture disposed within the first or primary combustion chamber will continue burning after the flame front 162 has crossed the flexible silicone rubber plate-type control check valve 116 and entered the second or secondary combustion chamber 106, however, such combustion occurs at a lower temperature level, begins to become extinguished, and therefore does not present any significant problems for the flexible silicone rubber plate-type control check valve 116 in connection with degradation of its structural integrity. This is because only residual amounts of air/fuel mixture remain within the first or primary combustion chamber 104, such air/fuel mixture continues to be consumed, the air/fuel mixture has become dispersed throughout the first or primary combustion chamber 104, and the resulting pressure and temperature levels thereof are characterized by declining gradients.

Figure 5:
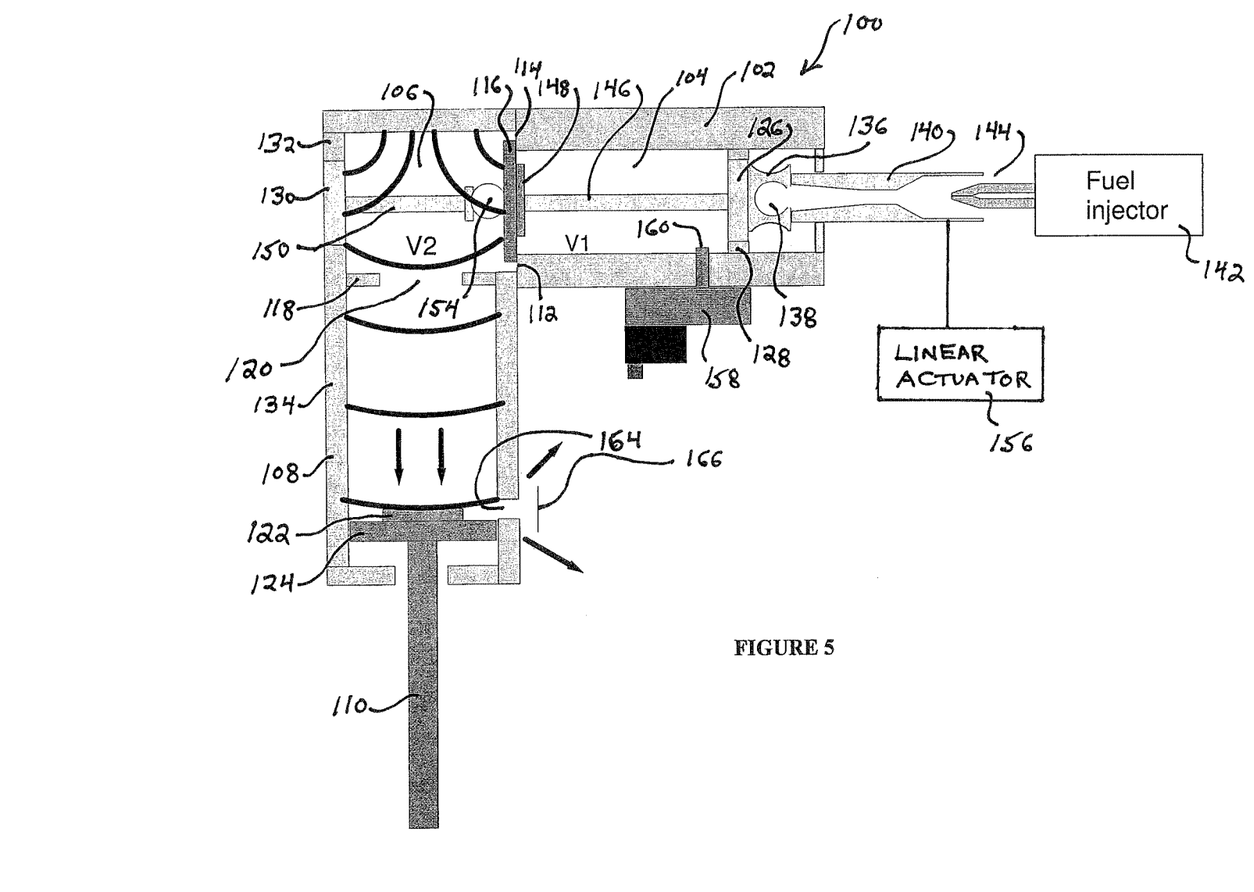

Continuing still further, and lastly, as illustrated within FIG. 5, it is additionally noted that when, or immediately after the first flame front 162 has passed by the flexible silicone rubber plate-type control check valve 116, this first flame front 162 substantially immediately results in the ignition of the air/fuel mixture disposed within the second or secondary combustion chamber 106 whereby a substantially large pressure spike is developed within the second or secondary combustion chamber 106 which causes the flexible silicone rubber plate-type control check valve 116 to return to and be seated upon its valve seats 114. This process is also aided somewhat by means of the inherent resiliency and memory of the silicone rubber material. Accordingly, further flame fronts 162 are prevented from traversing the flexible silicone rubber plate-type control check valve 116 so as to, again, prevent the flexible silicone rubber plate-type control check valve 116 from undergoing structural degradation. As a result of the return of the upper and lower portions of the flexible silicone rubber plate-type control check valve 116 to their closed and seated positions with respect to its valve seats 114, it can be appreciated that the second or secondary combustion chamber 106 is now effectively closed and sealed whereby the resulting pressures developed within the second or secondary combustion chamber 106 can now act upon the power or working piston 110, thereby causing the power or working piston 110 to move downwardly within the power or working cylinder 108 so as to move through its power or work stroke. While the power or working piston 110 moves downwardly within the power or working cylinder 108 so as to move through its power or work stroke, air, trapped beneath the larger piston head portion 124, is exhausted outwardly from the power or working cylinder 108 through means of an exhaust port 164, having a conventional check valve 166 operatively associated therewith, disposed within a lower side wall portion of the power or working cylinder 108. As the power or working piston 110 nears the end of its power or work stroke, as illustrated within FIG. 5, the larger head portion 124 of the power or working piston 110 will be disposed beneath the elevational position at which the exhaust port 164 and the check valve 166 are located whereby the pressurized air and combustion products acting upon the power or working piston 110 will be exhausted from the power or working cylinder 108. Subsequently, the temperature of the pressurized air and combustion products disposed within the power or working cylinder 108 will begin to cool, the air and gases will effectively contract, and vacuum conditions will begin to develop within the power or working cylinder 108 thereby causing or permitting the power or working piston 110 to rise within the power or working cylinder 108 and thereby return to its original or start position illustrated within FIG. 1. At this time, the linear actuator 156 is again actuated so as to move the linearly movable assembly, comprising the exhaust valve 130, the flexible silicone rubber plate-type control check valve 116, and the intake valve 126, to the left, as viewed within FIG. 1, from their closed or seated positions to their open or unseated positions relative respectively to the exhaust valve seat 132, the upper and lower valve seats 114, and the intake valve seat 128, whereby a new operational cycle can then be initiated.

Thus, it may be seen that in accordance with the principles and teachings of the present invention, there has been disclosed a new and improved combustion-powered tool comprising a primary combustion chamber, a secondary combustion chamber, and a working piston that is in fluidic connection with the secondary combustion chamber so as to be exposed to the pressures developed within the secondary combustion chamber, when combustion takes place within the secondary combustion chamber, such that the working piston can be driven through its working or power stroke. A flexible silicone rubber disk-type control check valve is interposed between the primary combustion chamber and the secondary combustion chamber so as to control the flow of unburned fuel from the primary combustion chamber into the secondary combustion chamber and yet prevent the flow of combustion products from the secondary combustion chamber back into the primary combustion chamber, when combustion occurs within the secondary combustion chamber, such that the pressures developed within the secondary combustion chamber, as a result of the combustion of the air/fuel mixture within the secondary combustion chamber, can in fact act upon the working piston so as to drive the same through its working or power stroke.

Obviously, many variations and modifications of the present invention are possible in light of the above teachings. It is therefore to be understood that within the scope of the appended claims, the present invention may be practiced otherwise than as specifically described herein.

NUMBER KEY

100—overall tool
102—elongated tube or cylinder for combustion chambers
104—main or primary combustion chamber
106—second or secondary combustion chamber
108—working/power cylinder
110—working/power piston
112—end wall of main or primary combustion chamber 104
114—valve seat for flexible silicone rubber disk-type check valve 116
116—flexible silicone rubber disk-type check valve
118—annular top wall of working/power cylinder 108
120—central aperture within 118
122—relatively small portion of piston head
124—relatively large portion of piston head
126—intake valve in main or primary combustion chamber 104
128—valve seat for 126
130—exhaust valve in 106
132—valve seat for 130
134—left end wall of 108
136—air/fuel mixture intake port assembly
138—air/fuel mixture outlet port of 136
140—venturi structure
142—fuel injector
144—jet pump
146—first axially oriented rod for mounting valve intake valve 126
148—mounting plate mounted upon opposite end of rod 146 for 116
149—air flow passages for air flow past check valve 116 when unseated
150—second axially oriented rod for mounting exhaust valve 130
152—head of 150
154—roller for 116
156—linear actuator
158—ignition device
160—spark plug
162—laminar flame front
164—exhaust port in side wall of 108
166—check valve operatively associated with 164

What is claimed as new and desired to be protected by Letters Patent of the United States of America, is:

1. A combustion-powered tool, comprising:
a first primary combustion chamber having an air/fuel mixture disposed therein for combustion;
a second secondary combustion chamber having an air/fuel mixture disposed therein for combustion;
an ignition device disposed within said first primary combustion chamber for initiating combustion of said air/fuel mixture disposed within said first primary combustion chamber;
a working/power piston exposed to said second secondary combustion chamber so as to undergo a power working stroke when combustion of said air/fuel mixture disposed within said second secondary combustion chamber occurs;
an intake valve operatively associated with said first primary combustion chamber;
an exhaust valve operatively associated with said second secondary combustion chamber;
a tie rod operatively interconnecting said intake and exhaust valves together; and
a flexible silicone rubber plate-type control check valve, interposed between said first primary combustion chamber and said second secondary combustion chamber and operatively mounted upon said tie rod for operatively cooperating with valve seat structure defined between said first primary combustion chamber and said second secondary combustion chamber, for opening fluid flow passages around peripheral edge portions of said flexible silicone rubber plate-type control check valve between said first primary and second secondary combustion chambers when said flexible silicone rubber plate-type check valve has been unseated from said valve seat structure as a result of combustion of said air/fuel mixture disposed within said first primary combustion chamber so as to permit a flame front from said first primary combustion chamber to pass into said second secondary combustion chamber in order to initiate combustion of said air/fuel mixture disposed within said second secondary combustion chamber, and for returning to said valve seat structure when combustion of said air/fuel mixture disposed within said second secondary combustion chamber occurs such that pressure forces can be impressed upon said working/power piston.

2. The combustion-powered tool as set forth in claim 1, further comprising:
a cylindrical roller operatively engaged with said flexible silicone rubber plate-type check valve.

3. The combustion-powered tool as set forth in claim 2, wherein:
said cylindrical roller is operatively engaged with a surface portion of said flexible silicone rubber plate-type check valve which faces into or is exposed to the interior of said second secondary combustion chamber.

4. The combustion-powered tool as set forth in claim 3, wherein:
said cylindrical roller is operatively engaged with a surface portion of said flexible silicone rubber plate-type check valve which faces into or is exposed to the interior of said second secondary combustion chamber such that when upper and lower peripheral edge portions of said flexible silicone rubber plate-type check valve are unseated from said valve structure so as to open said fluid flow passages, said upper and lower peripheral edge portions of said flexible silicone rubber plate-type check valve form arcuately curved sections around said cylindrical roller.

5. The combustion-powered tool as set forth in claim 1, wherein:
said intake valve operatively associated with said first primary combustion chamber is movable between open and closed positions with respect to said first primary combustion chamber for permitting a fresh charge of an air/fuel mixture to be ingested into said first primary combustion chamber when said intake valve is disposed at said open position, and for permitting combustion of said air/fuel mixture within said first primary combustion chamber when said intake valve is disposed at said closed position; and said exhaust valve operatively associated with said second secondary combustion chamber is movable between open and closed positions for permitting combustion products to be exhausted out from said second secondary combustion chamber when said exhaust valve is disposed at said open position, and for permitting combustion of said air/fuel mixture, disposed within said second secondary combustion chamber, to occur when said exhaust valve is disposed at said closed position.

6. The combustion-powered tool as set forth in claim 5, further comprising:

a linear actuator for moving said intake and exhaust valves between said open and closed positions.

7. The combustion-powered tool as set forth in claim 5, wherein:

said flexible silicone rubber plate-type control check valve and said cylindrical roller are operatively connected to said intake and exhaust valves; and said linear actuator moves said flexible silicone rubber plate-type control check valve and said cylindrical roller along with said intake and exhaust valves such that when said intake and exhaust valves are moved to said open positions, said flexible silicone rubber plate-type control check valve is moved away and unseated from said valve seat structure, and when said linear actuator moves said intake and exhaust valves to their closed positions, said flexible silicone rubber plate-type control check valve is moved toward and seated upon said valve seat structure.

8. The combustion-powered tool as set forth in claim 1, further comprising:

a fuel injector for injecting a flow of fuel toward said first primary combustion chamber; and a jet pump operatively associated with said fuel injector such that ambient air can be entrained into said flow of fuel from said fuel injector and thereby form an air/fuel mixture to be ingested into said first primary combustion chamber.

9. The combustion-powered tool as set forth in claim 1, further comprising:

a working/power cylinder within which said working/power piston is operatively disposed.

10. The combustion-powered tool as set forth in claim 9, wherein:

said first primary combustion chamber and said second secondary combustion chambers are defined around a first axis; and said working/power cylinder is defined around a second axis which is perpendicular to said first axis.

11. The combustion-powered tool as set forth in claim 9, further comprising:

an exhaust valve disposed within a lower region of said working/power cylinder for permitting air, disposed beneath said working/power piston, to be exhausted from said working/power cylinder as said working/power piston undergoes a working/power stroke.

\* \* \* \* \*